United States Patent
Ishiba

(10) Patent No.: US 8,505,854 B2
(45) Date of Patent: Aug. 13, 2013

(54) FLIGHT ASSISTANCE APPARATUS

(75) Inventor: Masatsugu Ishiba, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 578 days.

(21) Appl. No.: 12/685,018

(22) Filed: Jan. 11, 2010

(65) Prior Publication Data

US 2010/0181431 A1    Jul. 22, 2010

(30) Foreign Application Priority Data

Jan. 16, 2009  (JP) .................................. 2009-007948

(51) Int. Cl.
*B64D 45/06*   (2006.01)
*B64C 13/00*   (2006.01)

(52) U.S. Cl.
USPC ............. 244/194; 244/76 R; 244/223; 434/35

(58) Field of Classification Search
USPC .................. 244/76 R, 194, 223; 434/30, 31, 434/35, 45
See application file for complete search history.

(56) References Cited

U.S. PATENT DOCUMENTS

| | | | | |
|---|---|---|---|---|
| 2,923,499 A | * | 2/1960 | Dinard | 244/76 R |
| 3,292,882 A | * | 12/1966 | Walsh | 244/76 R |
| 5,560,570 A | * | 10/1996 | Pierson et al. | 244/195 |
| 6,314,366 B1 | * | 11/2001 | Farmakis et al. | 701/482 |
| 6,679,458 B2 | * | 1/2004 | Einthoven et al. | 244/223 |
| 7,606,115 B1 | * | 10/2009 | Cline et al. | 367/124 |

FOREIGN PATENT DOCUMENTS

| | | |
|---|---|---|
| JP | 6-265627 | 9/1994 |
| JP | 10-187262 | 7/1998 |
| JP | 10-264894 | 10/1998 |
| JP | 2002-240797 | 8/2002 |
| JP | 2002-293300 | 10/2002 |
| JP | 2005-173663 | 6/2005 |
| JP | 2008-543645 | 12/2008 |
| JP | 2008-543654 | 12/2008 |

* cited by examiner

*Primary Examiner* — Rob Swiatek

(74) *Attorney, Agent, or Firm* — Finnegan, Henderson, Farabow, Garrett & Dunner, LLP

(57) ABSTRACT

A flight assistance apparatus for providing assistance in flying an aircraft, including: a yoke operated by a pilot of the aircraft; and a flight instruction section that instructs, with an aid of the yoke, the pilot to fly the aircraft in such a manner as to avoid a critical flight range when the aircraft approaches the critical flight range.

11 Claims, 15 Drawing Sheets

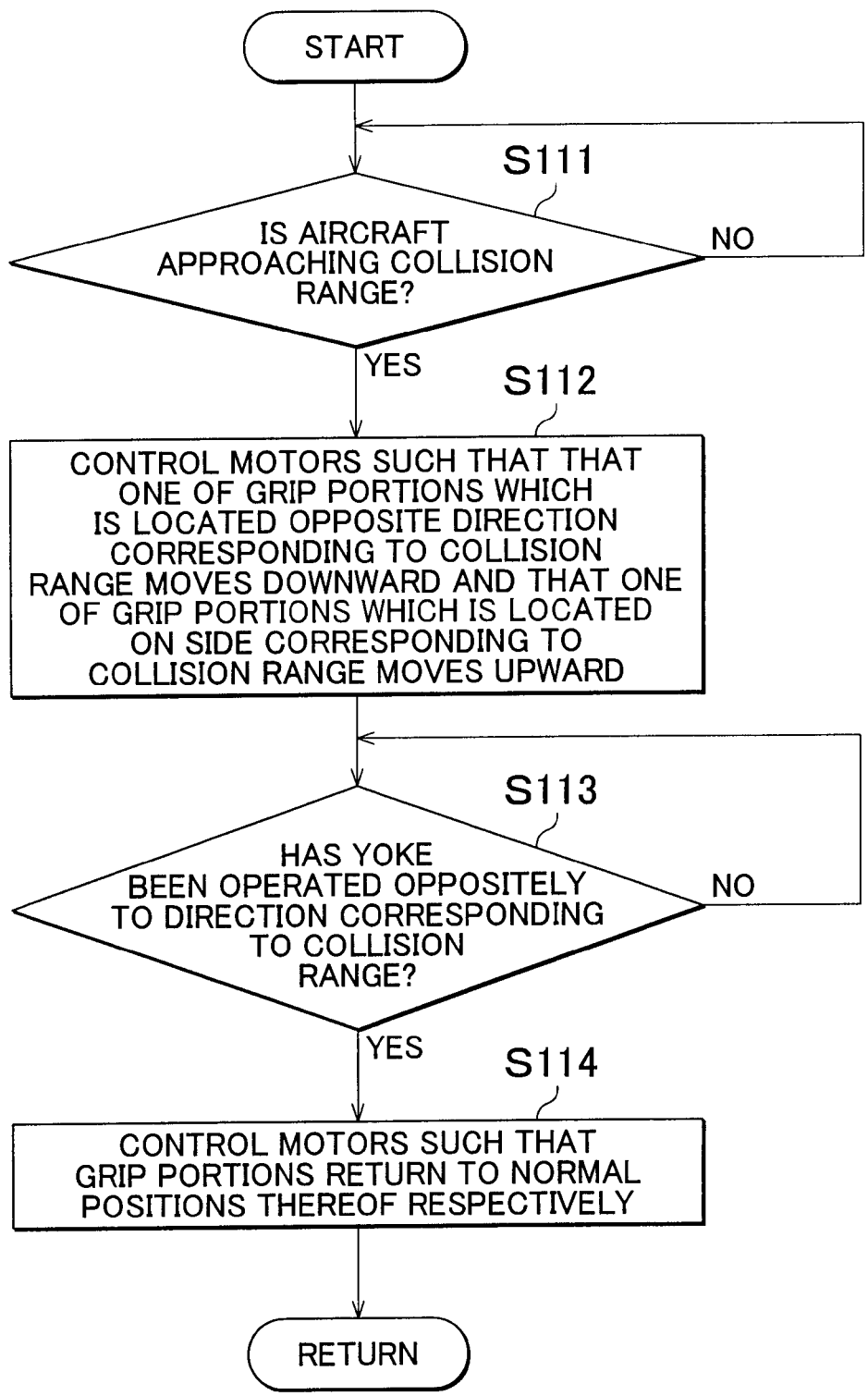

FLIGHT ASSISTANCE APPARATUS

INCORPORATION BY REFERENCE

The disclosure of Japanese Patent Application No. 2009-007948 filed on Jan. 16, 2009 including the specification, drawings and abstract is incorporated herein by reference in its entirety.

BACKGROUND OF THE INVENTION

1. Field of the Invention

The invention relates to a flight assistance apparatus that provides assistance in flying an aircraft.

2. Description of the Related Art

As a flight assistance apparatus, as described in, for example, Japanese Patent Application Publication No. 10-264894 (JP-A-10-264894), there is proposed an art for informing a pilot of an approach of an aircraft to a stall state by causing a flight grip member provided at a tip of a flight lever member to vibrate when the aircraft approaches the stall state.

However, the pilot may not be enabled to take an appropriate measure when the aircraft approaches a critical flight range such as the stall state or the like as in the aforementioned related art by simply causing the flight grip member to vibrate.

SUMMARY OF THE INVENTION

The invention provides a flight assistance apparatus that enables a pilot to fly an aircraft appropriately when the aircraft approaches a critical flight range.

An aspect of the invention relates to a flight assistance apparatus that provides assistance in flying an aircraft. The flight assistance apparatus is equipped with a yoke operated by a pilot of the aircraft, and a flight instruction section that instructs, with an aid of the yoke, the pilot to fly the aircraft in such a manner as to avoid a critical flight range when the aircraft approaches the critical flight range.

In the aforementioned construction, when the aircraft approaches the critical flight range, the pilot is instructed to fly the aircraft in such a manner as to avoid the critical flight range by, for example, moving a component of the yoke in a direction corresponding to such a direction as to avoid the critical flight range. The pilot then operates the yoke in the direction corresponding to such a direction as to avoid the critical flight range. In this manner, even when the aircraft approaches the critical flight range, the pilot can fly the aircraft appropriately.

According to the aforementioned construction, when the aircraft approaches the critical flight range, the pilot can fly the aircraft appropriately. Thus, the aircraft can be smoothly prevented from plunging into the critical flight range.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a flowchart showing an instruction processing procedure performed by a controller shown in FIG. 4;

DETAILED DESCRIPTION OF EMBODIMENTS

The embodiments of a flight assistance apparatus according to the invention will be described hereinafter in detail with reference to the drawings.

Figure 1:
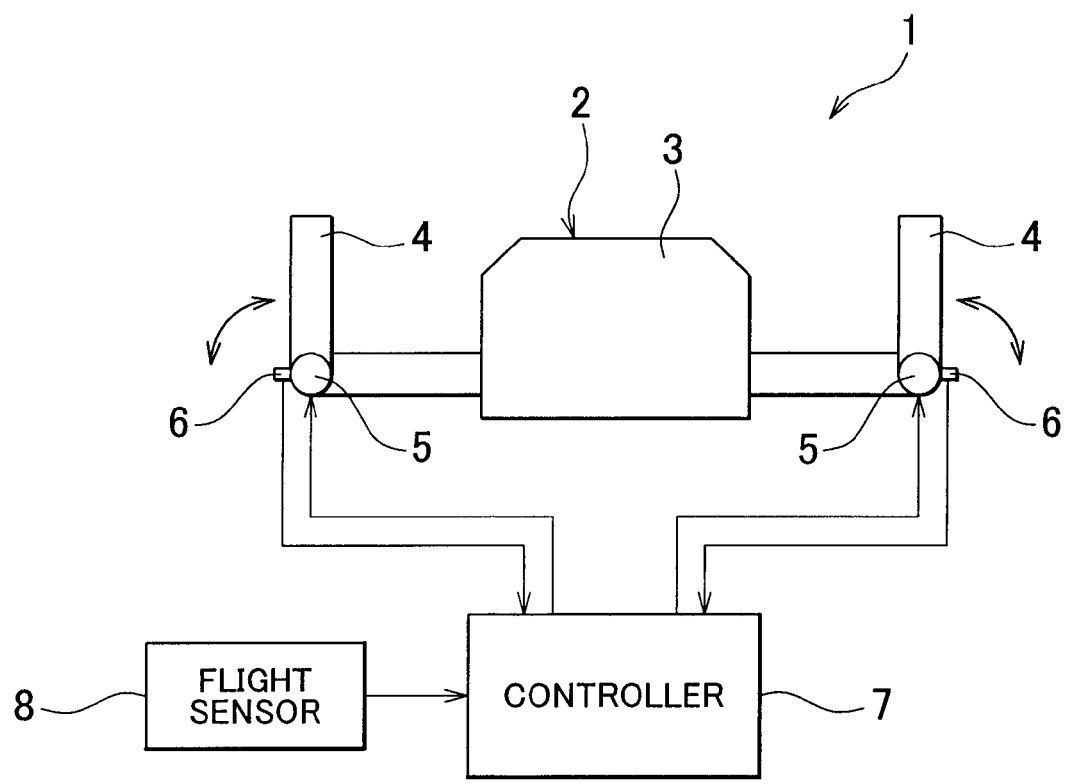
FIG. 1 is a schematic constructional view showing a flight assistance apparatus according to the first embodiment of the invention.

FIG. 1 is a schematic constructional view showing a flight assistance apparatus according to the first embodiment of the invention. Referring to FIG. 1, a flight assistance apparatus 1 according to this embodiment of the invention is equipped with a yoke 2 operated by a pilot of an aircraft. The yoke 2 has a column body 3, and a pair of right and left grip portions 4 turnably coupled to both ends of the column body 3 respectively to be gripped by the pilot. The grip portions 4 are turnable around an axis extending a longitudinal direction (a direction perpendicular to the sheet of FIG. 1). The yoke 2 has built therein two motors 5 for turning the grip portions 4 respectively, and two potentiometers 6 for detecting rotational angles of the motors 5 (turning angles of the grip portions 4) respectively.

Further, the flight assistance apparatus 1 is equipped with a controller 7 connected to the respective motors 5 and the respective potentiometers 6. A flight sensor 8 that detects an operation direction of the yoke 2 and an angle of the yoke 2 is connected to the controller 7. The controller 7 controls the motors 5 to instruct the pilot to operate the yoke 2 in such a direction as to avoid a critical flight range (a collision range in this case) when a fuselage of the aircraft approaches the collision range.

Figure 2:
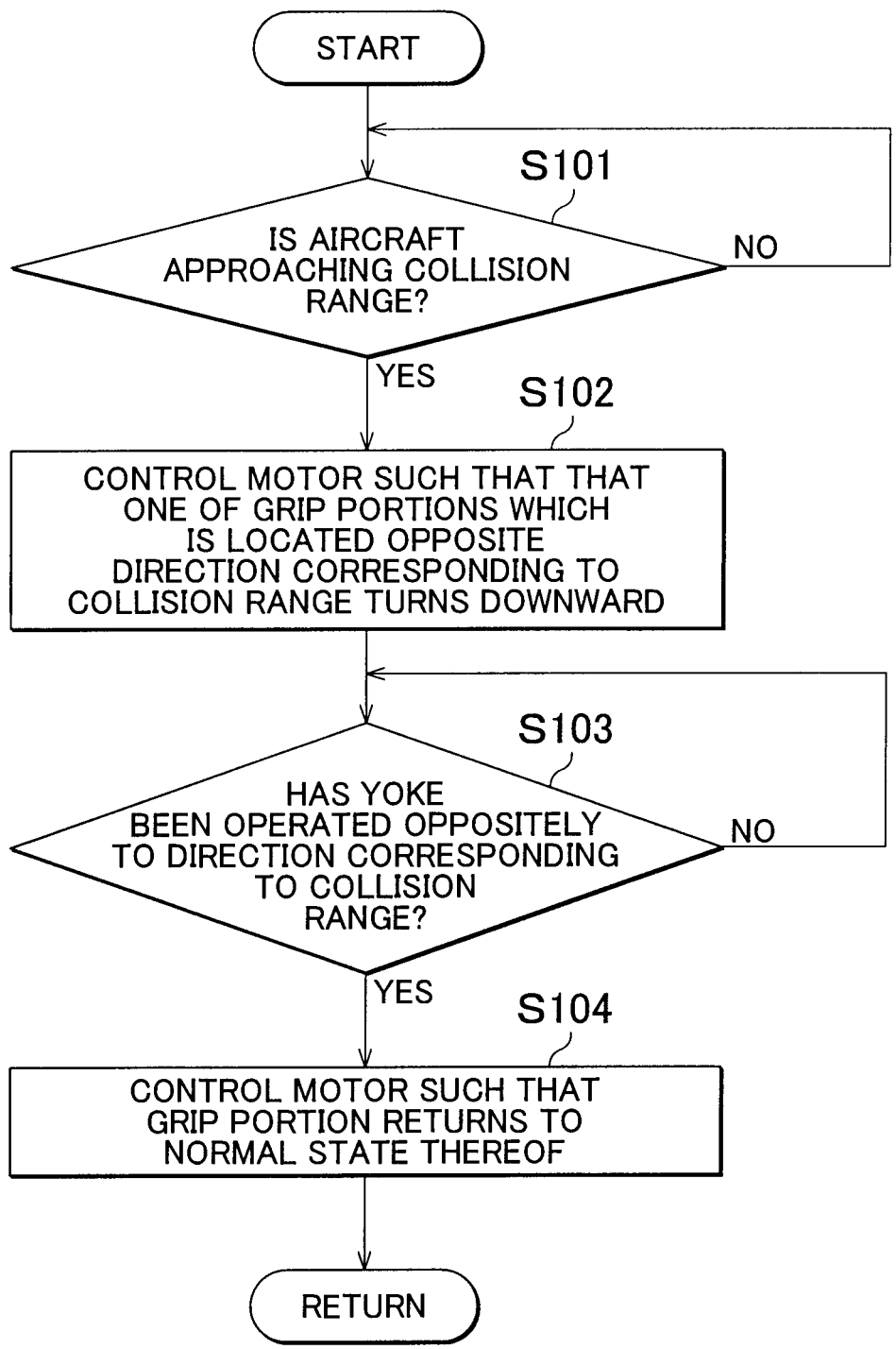
FIG. 2 is a flowchart showing an instruction processing procedure performed by a controller shown in FIG. 1.

FIG. 2 is a flowchart showing an instruction processing procedure performed by the controller 7. Referring to FIG. 2, it is first determined by a radar (not shown) or the like whether or not the fuselage has approached the collision range (step S101). When it is determined that the fuselage has approached the collision range, that one of the motors 5 which corresponds to that one of the grip portions 4 which is located opposite a direction corresponding to the collision range is controlled such that that grip portion 4 is turned to tilt (downward) from a normal state as shown in FIG. 1 (step S102).

Figure 3A:
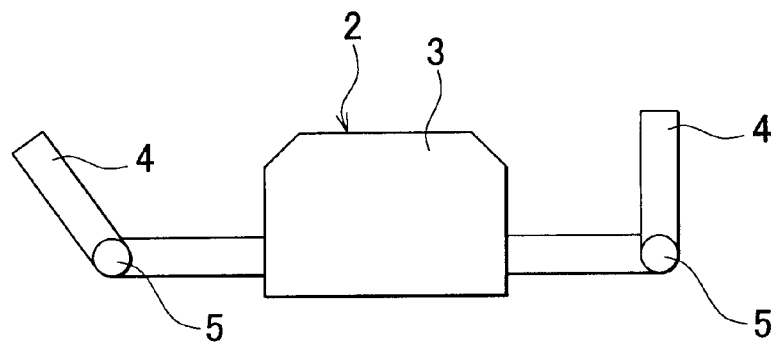
FIGS. 3A, 3B, and 3C are views each showing an example of an operation state of a yoke shown in FIG. 1.

For example, when it is desired to turn the fuselage left since the collision range exists to the right of and in front of the fuselage, the left grip portion 4 is turned downward from the normal state as shown in FIG. 3A. In this case, the grip portion 4 may be turned by a predetermined angle or by an angle corresponding to a target aileron operation amount.

It is then determined on the basis of a detection signal of a flight sensor 8 whether or not the yoke 2 has been operated by an amount equal to or larger than a predetermined amount in a turning direction of the grip portion 4 (oppositely to a direction corresponding to the collision range) (step S103). In this case, the grip portion 4 is held in a tilted state until the yoke 2 is operated in the turning direction of the grip portion 4. Then, when it is determined that the yoke 2 has been operated in the turning direction of the grip portion 4 by the amount equal to or larger than the predetermined amount, that one of the motors 5 which corresponds to the grip portion 4 held in the tilted state is controlled such that the grip portion 4 is turned upward and returned to a normal state thereof (a state shown in FIG. 1) (step S104).

Figure 3B:
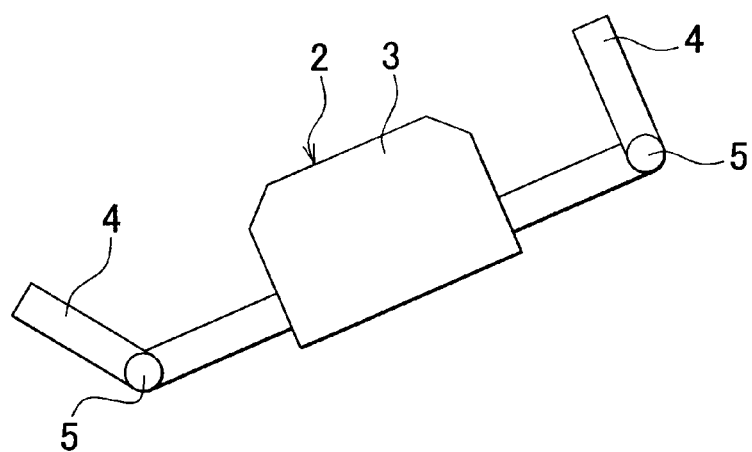
Figure 3C:
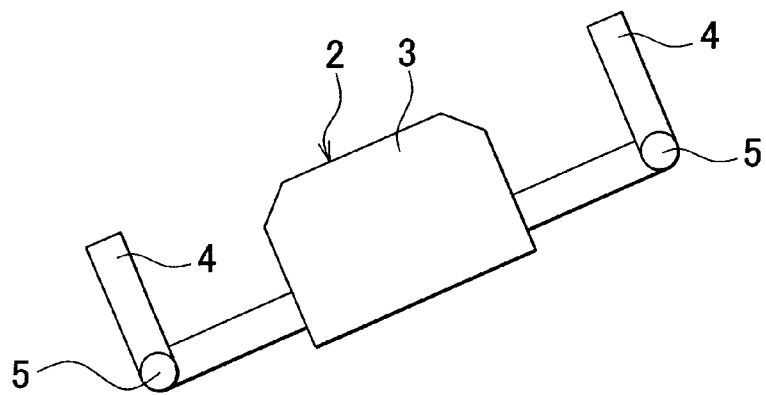

For example, in a state where the left grip portion 4 is tilted down (see FIG. 3A), when the yoke 2 is operated leftward by the predetermined amount as shown in FIG. 3B, the left grip portion 4 returns to the normal state thereof as shown in FIG. 3C.

In the aforementioned construction, the motors 5, the controller 7, and the flight sensor 8 constitute a flight instruction section that instructs, with the aid of the yoke 2, the pilot to fly the aircraft in such a manner as to avoid a critical flight range when the aircraft approaches the critical flight range.

As described above, in this embodiment of the invention, that one of the grip portions 4 which is located opposite the direction corresponding to the collision range is turned downward. The pilot is thereby caused to recognize, through the feeling of his/her hand, that the fuselage is approaching the collision range, and is instructed of a due direction in which the fuselage should travel. Therefore, the pilot can operate the yoke 2 in the due direction. Thus, even when the fuselage approaches the collision range, the pilot can fly the fuselage appropriately and as a result, can avoid a collision smoothly.

In this embodiment of the invention, when the fuselage approaches the collision range, that one of the grip portions 4 which is located opposite the direction corresponding to the collision range is simply turned downward. However, simultaneously with the operation of turning this grip portion 4, that one of the grip portions 4 which is located on the side corresponding to the collision range may be turned upward.

Figure 4:
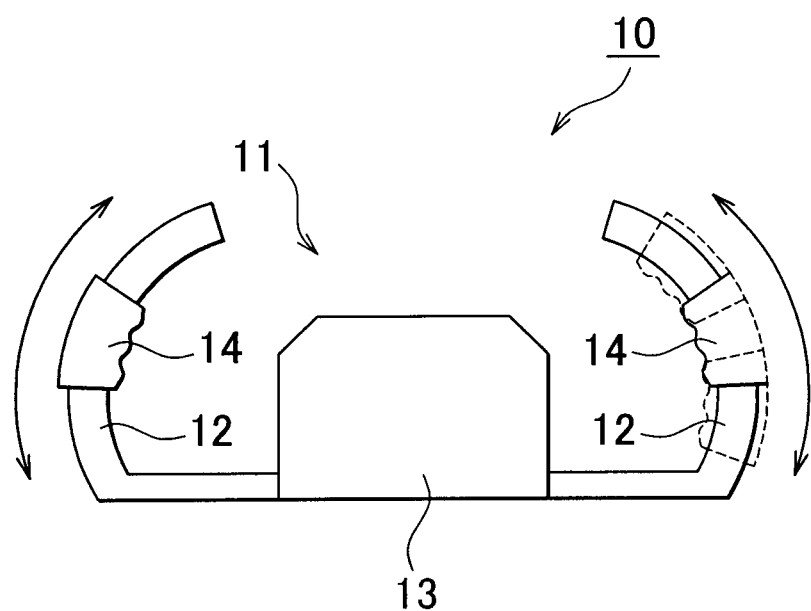
FIG. 4 is a front view showing a main portion of a flight assistance apparatus according to the second embodiment of the invention.

FIG. 4 is a front view showing a main portion of a flight assistance apparatus according to the second embodiment of the invention. In FIG. 4, elements identical to those of the first embodiment of the invention are denoted by the same reference symbols respectively, and the description of those elements is omitted.

Referring to FIG. 4, a flight assistance apparatus 10 according to this embodiment of the invention is equipped with a yoke 11 instead of the yoke 2 in the first embodiment of the invention. The yoke 11 has a column body 13 provided with a pair of right and left curved handles 12, and a pair of right and left grip portions 14 mounted to the handles 12 respectively to be gripped by the pilot. Each of the grip portions 14 is movable along a direction in which a corresponding one of the handles 12 extends.

Figure 5A:
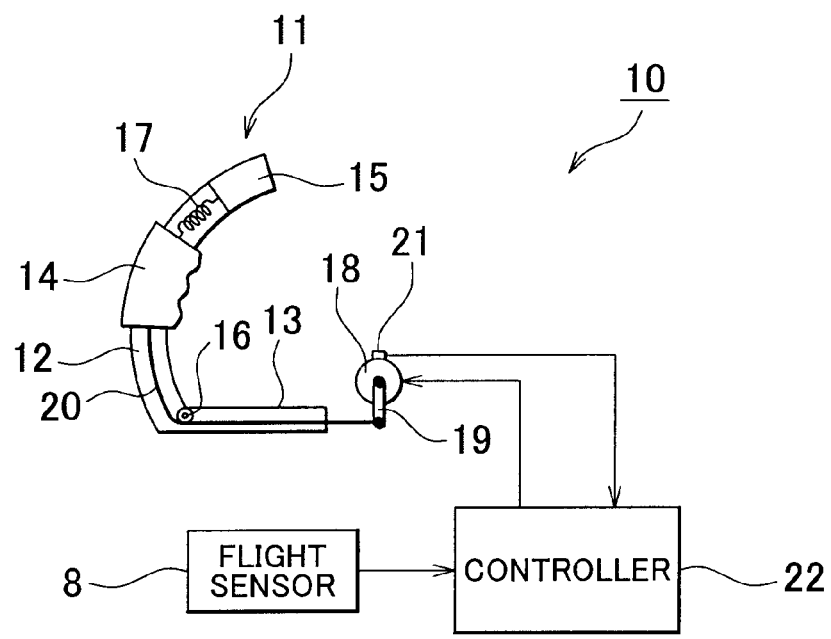
FIGS. 5A and 5B each show a flight assistance apparatus including a construction for moving each of grip portions shown in FIG. 4 along a corresponding one of handles shown in FIG. 4.

FIG. 5A is a schematic constructional view of the flight assistance apparatus 10, which includes a construction for moving each of the grip portions 14 along a corresponding one of the handles 12. Referring to FIG. 5A, a salient portion 15 is provided at a tip of the handle 12, and a pulley 16 is mounted to a base end of the handle 12. A spring 17 is connected at one end thereof to the salient portion 15, and at the other end thereof to an upper end of the grip portion 14.

The yoke 11 has a motor 18 built therein, and a coupling member 19 is mounted to an output shaft of the motor 18. A wire 20 hung around the pulley 16 is fixed at one end thereof to the coupling member 19. The wire 20 is fixed at the other end thereof to a lower end of the grip portion 14. When the motor 18 is rotationally driven, rotation of the motor 18 is transmitted to the grip portion 14 via the coupling member 19 and the wire 20, and the grip portion 14 moves along the handle 12 in accordance with a rotational direction of the motor 18. Further, the yoke 11 has built therein a potentiometer 21 for detecting a rotational angle of the motor 18 (an amount of movement of the grip portion 14). Although not shown, the motors 18 and the potentiometers 21 are provided for the right and left grip portions 14 respectively.

Further, the flight assistance apparatus 10 is equipped with a controller 22 connected to the flight sensor 8, the motors 18, and the potentiometers 21. The controller 22 controls the motors 18 to instruct the pilot to operate the yoke 11 in such a direction as to avoid the critical flight range (the collision range in this case as well) when the fuselage approaches the collision range.

Figure 5B:
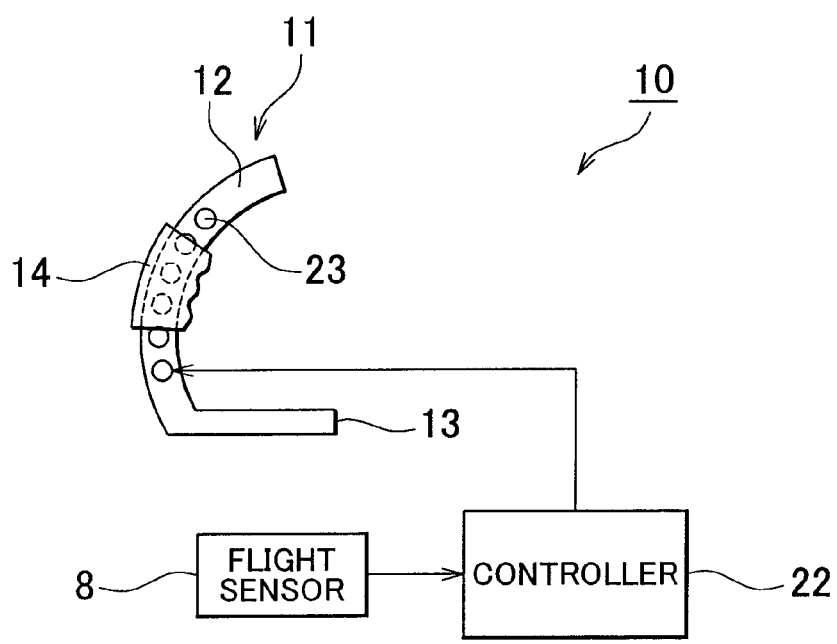

FIG. 5B is a schematic constructional view of the flight assistance apparatus 10, which includes another construction for moving each of the grip portions 14 along a corresponding one of the handles 12. Referring to FIG. 5B, each of linear motors 23 is mounted to a corresponding one of the handles 12 along a direction in which this handle 12 extends. By driving each of the linear motors 23, a corresponding one of the grip portions 14 moves along a corresponding one of the handles 12. The controller 22 is connected to the linear motors 23.

FIG. 6 is a flowchart showing an instruction processing procedure performed by the controller 22. It is assumed that the grip portions 14 of the yoke 11 are usually located at substantially central positions (normal positions) of the handles 12 respectively as shown in FIG. 4.

Referring to FIG. 6, it is first determined by a radar (not shown) or the like whether or not the fuselage has approached the collision range (step S111). When it is determined that the fuselage has approached the collision range, the motors 18 or the linear motors 23 are controlled such that that one of the grip portions 14 which is located opposite the direction corresponding to the collision range is moved downward and that one of the grip portions 14 which is located on the side corresponding to the collision range is moved upward (step S112).

Figure 7:
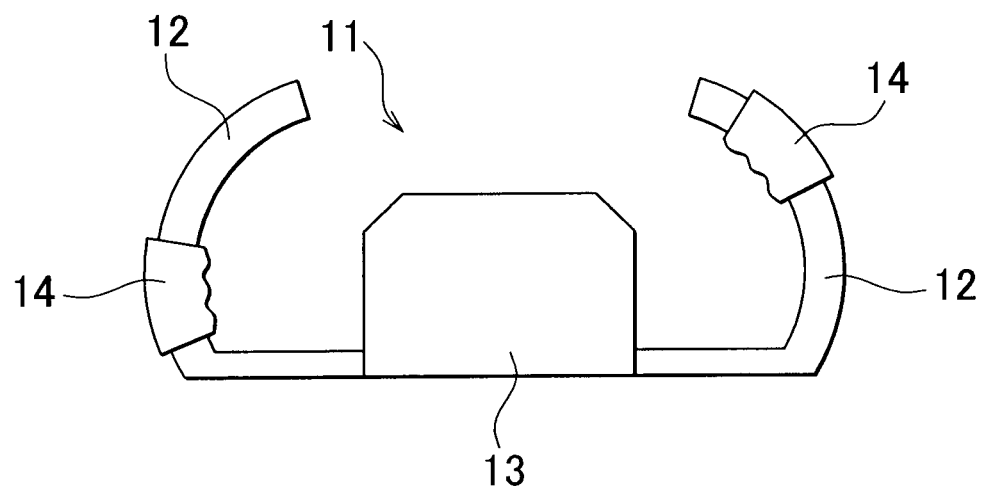
FIG. 7 is a view showing an example of an operation state of a yoke shown in FIG. 4.

For example, when it is desired to turn the fuselage left since the collision range exists to the right of and in front of the fuselage, the left grip portion 14 is moved downward from the central position, and the right grip portion 14 is moved upward from the central position as shown in FIG. 7. In this case, each of the grip portions 14 may be moved by a predetermined amount or by an amount corresponding to a target aileron operation amount.

Subsequently, it is determined on the basis of a detection signal of the flight sensor 8 whether or not the yoke 11 has been operated oppositely to the direction corresponding to the collision range by an amount equal to or larger than a predetermined amount (step S113). In this case, that one of the grip portions 14 which is located opposite the direction corresponding to the collision range is moved downward, and that one of the grip portions 14 which is located on the side corresponding to the collision range is held in an upward moved state, until the yoke 11 is operated oppositely to the direction corresponding to the collision range.

Then, when it is determined that the yoke 11 has been operated oppositely to the direction corresponding to the collision range by the amount equal to or larger than the predetermined amount, the motors 18 or the linear motors 23 are controlled such that the grip portions 14 are returned to the central positions of the handles 12 respectively (step S114).

In the aforementioned construction, the flight sensor 8, the pulleys 16, the springs 17, the motors 18, the coupling members 19, the wires 20, the controller 22, and the linear motors 23 constitute a flight instruction section that instructs, with the aid of the yoke 11, the pilot to fly the aircraft in such a manner as to avoid a critical flight range when the aircraft approaches the critical flight range.

As described above, in this embodiment of the invention, the right and left grip portions 14 are moved in opposite directions with respect to the handles 12 respectively. The pilot is thereby caused to recognize, through the feeling of his/her hand, that the fuselage is approaching the collision range, and is instructed of a due direction in which the fuselage should travel. Therefore, the pilot can operate the yoke 11 in the due direction. Thus, even when the fuselage approaches the collision range, the pilot can fly the fuselage appropriately.

In this embodiment of the invention, when the yoke 11 is operated oppositely to the direction corresponding to the collision range by the amount equal to or larger than the predetermined amount, the grip portions 14 are returned to the central positions of the handles 12 respectively. However, it is not absolutely required to return the grip portions 14 to the central positions of the handles 12 respectively. In this case, when the yoke 11 is operated such that the grip portions 14 are located at the same height, the respective grip portions 14 may be moved such that the fuselage resumes flying horizontally.

Figure 8:
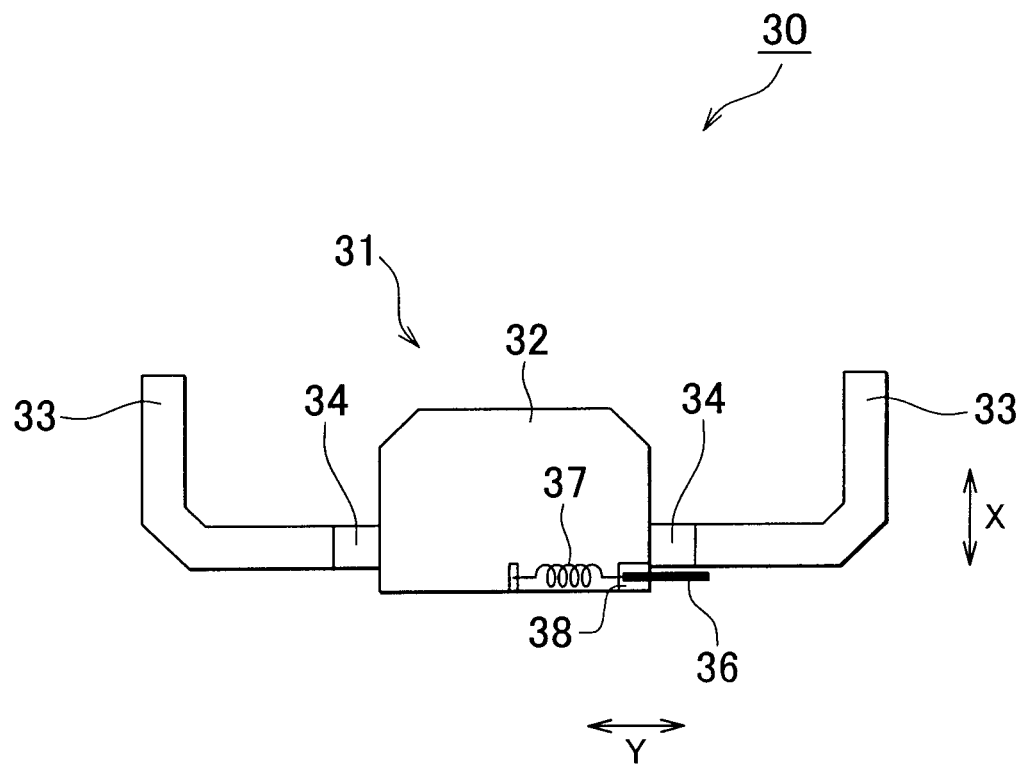
FIG. 8 is a front view showing a main portion of a flight assistance apparatus according to the third embodiment of the invention.
Figure 9:
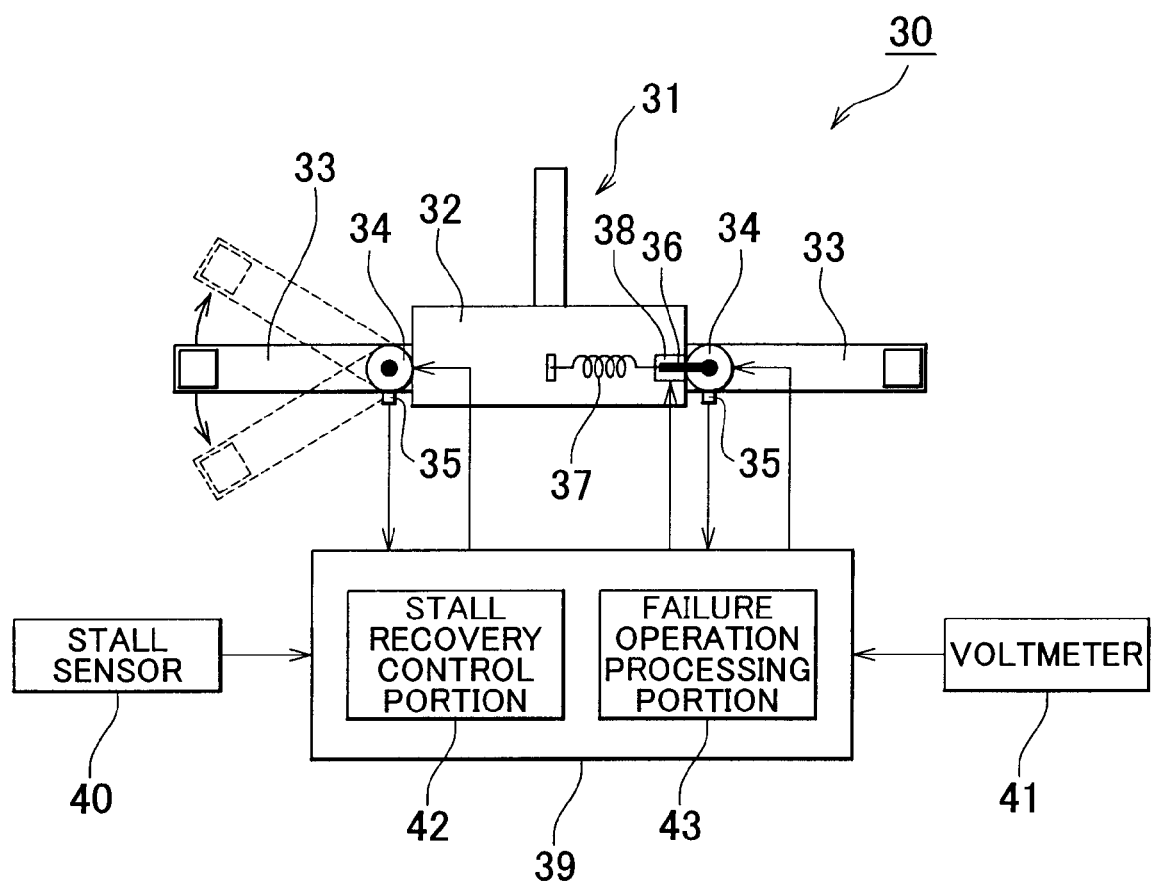
FIG. 9 is a schematic constructional view of the flight assistance apparatus, including a plan view of a yoke shown in FIG. 8.

FIG. 8 is a front view showing a yoke as a main portion of a flight assistance apparatus according to the third embodiment of the invention. FIG. 9 is a schematic constructional view of the flight assistance apparatus including a plan view of the yoke shown in FIG. 8.

Referring to each of FIGS. 8 and 9, a flight assistance apparatus 30 according to this embodiment of the invention is equipped with a yoke 31 instead of the yoke 2 in the first embodiment of the invention. The yoke 31 has a column body 32, and a pair of right and left generally L-shaped grip portions 33 turnably coupled to both ends of the column body 32 respectively to be gripped by the pilot. The grip portions 33 are turnable around an axis extending vertically (in an X direction of FIG. 8). The yoke 31 has built therein two motors 34 for turning the grip portions 33 respectively, and two potentiometers 35 for detecting rotational angles of the motors 34 (turning angles of the grip portions 33) respectively.

The column body 32 has built in a lower portion thereof a restraint pin 36 for restraining the turning of each of the grip portions 33, a spring 37 connected to the restraint pin 36, and an electromagnetic coil 38 for moving the restraint pin 36 laterally (in a Y direction of FIG. 8). When the supply of electricity to the electromagnetic coil 38 (excitation) is started, the restraint pin 36 is retracted in the column body 32. When the supply of electricity to the electromagnetic coil 38 (excitation) is stopped, the restraint pin 36 protrudes from an end face of the column body 32. Although the single restraint pin 36, the single spring 37, and the single electromagnetic coil 38 are shown in each of FIGS. 8 and 9, the two restraint pins 36, the two springs 37, and the two electromagnetic coils 38 are so provided as to correspond to the right and left grip portions 33 respectively.

Further, the flight assistance apparatus 30 is equipped with a controller 39 to which the respective motors 34, the respective potentiometers 35, and the respective electromagnetic coils 38 are connected. A stall sensor 40 for detecting a stall state of the fuselage and voltmeters 41 for measuring drive voltages of the motors 34 respectively are connected to the controller 39.

The controller 39 has a stall recovery control portion 42 and a failure operation processing portion 43. The stall recovery control portion 42 controls the motors 34 to instruct the pilot to operate the yoke 31 in such a direction as to make a recovery from a stall of the fuselage when the fuselage approaches a critical flight range (a stall state in this case). The failure operation processing portion 43 controls the electromagnetic coils 38 to restrain the operation of turning the grip portions 33 when the motors 34 become unlikely to operate due to a malfunction or the like.

Figure 10:
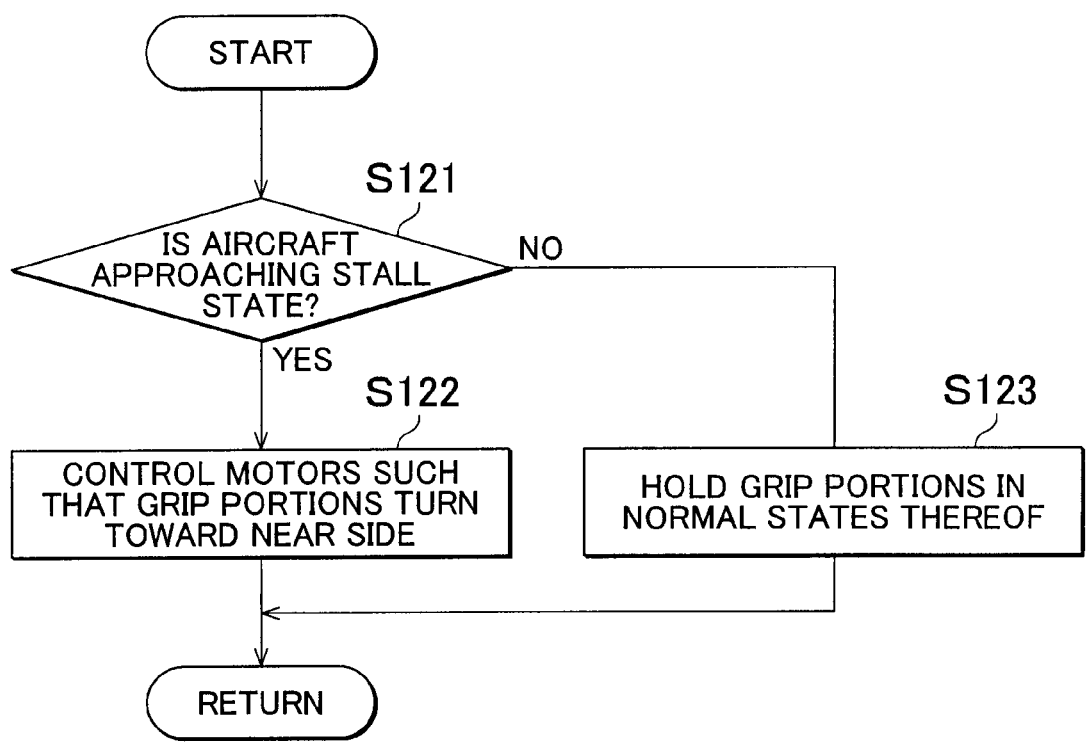
FIG. 10 is a flowchart showing an instruction processing procedure performed by a stall recovery control portion shown in FIG. 9.

FIG. 10 is a flowchart showing an instruction processing procedure performed by the stall recovery control portion 42. It should be noted that the grip portions 33 usually extend laterally rectilinearly as shown in FIG. 9 instead of being bent with respect to the column body 32.

Figure 11:
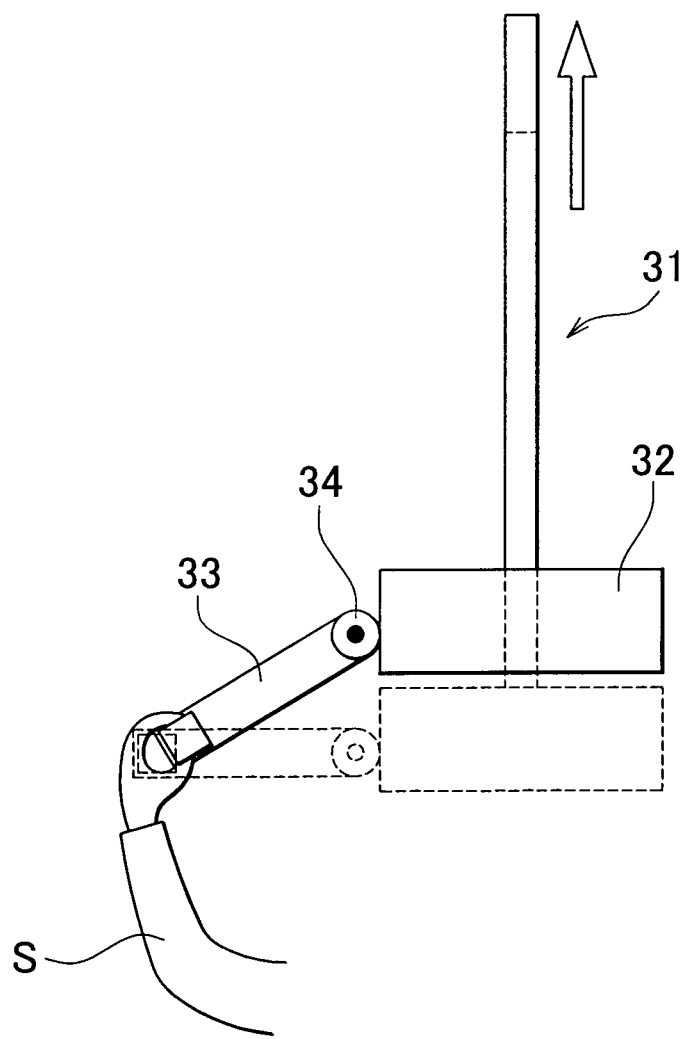
FIG. 11 is a plan view showing a state where one of the grip portions shown in FIG. 9 has been turned toward a near side with respect to a column body.

Referring to FIG. 10, it is first determined on the basis of a detection value of the stall sensor 40 whether or not the fuselage is approaching a stall state (step S121). When it is determined that the fuselage is approaching the stall state, the motors 34 are controlled such that both the grip portions 33 are turned toward a near side (toward the pilot side) with respect to the column body 32 as shown in FIG. 11 (step S122). In this case, the grip portions 33 are turned toward the near side of the pilot as far as their end positions respectively. Thus, the pilot recognizes that the fuselage is approaching the stall state, and tilts the yoke 31 forward as shown in FIG. 11. As a result, the fuselage can get out of a stall pitch angle.

On the other hand, when it is determined that the fuselage is not approaching the stall state, the respective grip portions 33 are held in their normal states respectively, namely, extending laterally rectilinearly with respect to the yoke 32 (step S123). Accordingly, when the fuselage recovers from the stall state, the motors 34 are controlled such that both the grip portions 33 assume their normal states with respect to the column body 32 respectively.

Figure 12:
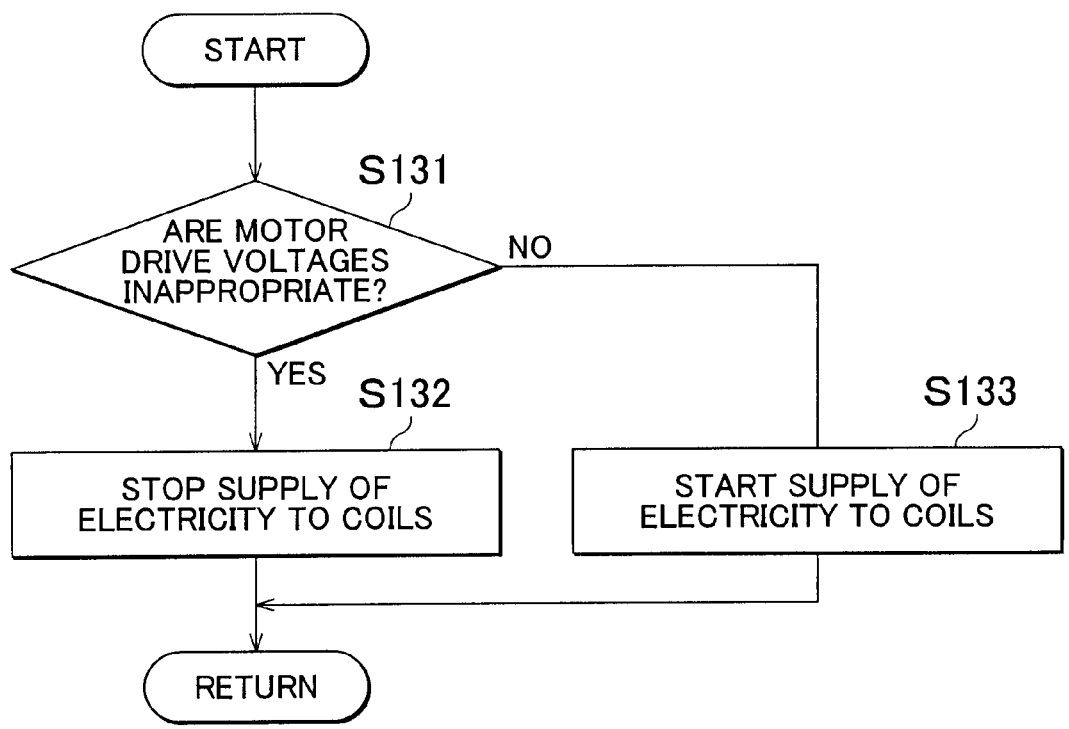
FIG. 12 is a flowchart showing a processing procedure performed by a failure operation processing portion shown in FIG. 9.

FIG. 12 is a flowchart showing an instruction processing procedure performed by the failure operation processing portion 43. In a normal state, the supply of electricity to the electromagnetic coils 38 is started to retract the restraint pins 36 into the column body 32.

Referring to FIG. 12, it is determined on the basis of measurement values of the voltmeters 41 whether or not drive voltages of the motors 34 are inappropriate respectively (step S131). When it is determined that the drive voltages of the motors 34 are inappropriate respectively, the supply of electricity to the electromagnetic coils 38 is stopped to protrude the restraint pins 36 from the end faces of the column body 32 respectively (step S132). Thus, the grip portions 33 are restrained from turning and held in their normal states respectively, namely, extending laterally rectilinearly with respect to the column body 32.

On the other hand, when it is determined that the drive voltages of the motors 34 are not inappropriate respectively, the supply of electricity to the electromagnetic coils 38 is continued (step S133). Thus, the restraint pins 36 remain retracted in the column body 32, and the operation of turning the grip portions 33 is possible.

In the aforementioned construction, the motors 34, the stall sensor 40, and the stall recovery control portion 42 constitute a flight instruction section that instructs, with the aid of the yoke 31, the pilot to fly the aircraft in such a manner as to avoid a critical flight range when the aircraft approaches the critical flight range.

As described above, in this embodiment of the invention, both the grip portions 33 are turned toward the near side (the pilot side) with respect to the column body 32 to thereby instruct the pilot of an approach of the fuselage to a stall state. Therefore, the pilot can operate the yoke 31 in such a direction as to avoid a stall (forward). Thus, even when the fuselage approaches the stall state, the pilot can fly the fuselage appropriately and as a result, can make a recovery from the stall smoothly.

Further, when the fuselage approaches the stall state, both the grip portions 33 are turned toward the near side with respect to the column body 32. Therefore, the pilot can move the yoke 31 forward with the longitudinal position of his/her arm S hardly changed as shown in FIG. 11.

Figure 13:
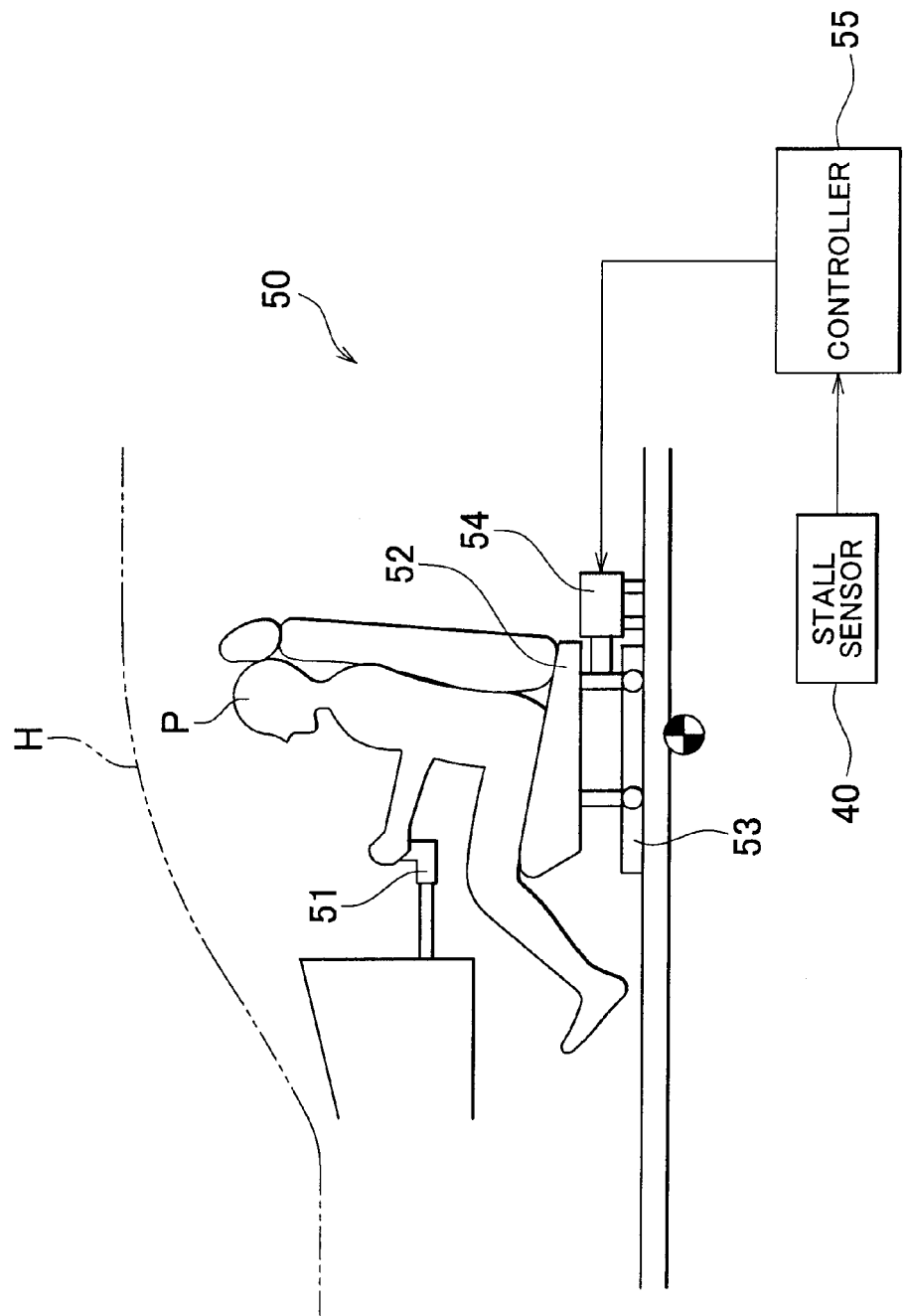
FIG. 13 is a schematic constructional view showing a flight assistance apparatus according to the fourth embodiment of the invention.

FIG. 13 is a schematic constructional view showing a flight assistance apparatus according to the fourth embodiment of the invention. In FIG. 13, elements identical to those of the third embodiment of the invention are denoted by the same reference symbols respectively, and the description of those elements is omitted.

Referring to FIG. 13, a flight assistance apparatus 50 according to this embodiment of the invention is equipped with a yoke 51 operated by a pilot P, a rail guide 53 for guiding a seat 52, in which the pilot P is seated, in a longitudinal direction of a fuselage H, an actuator 54 fixed to a leg portion of the seat 52 to move the seat 52 along the rail guide 53 in the longitudinal direction of the fuselage H, and a controller 55 to which the actuator 54 and the aforementioned stall sensor 40 are connected.

The controller 55 controls the actuator 54 to instruct the pilot P to operate the yoke 51 in such a direction as to make a recovery from a stall of the fuselage H when the fuselage H approaches a critical flight range (a stall state in this case as well).

Figure 14:
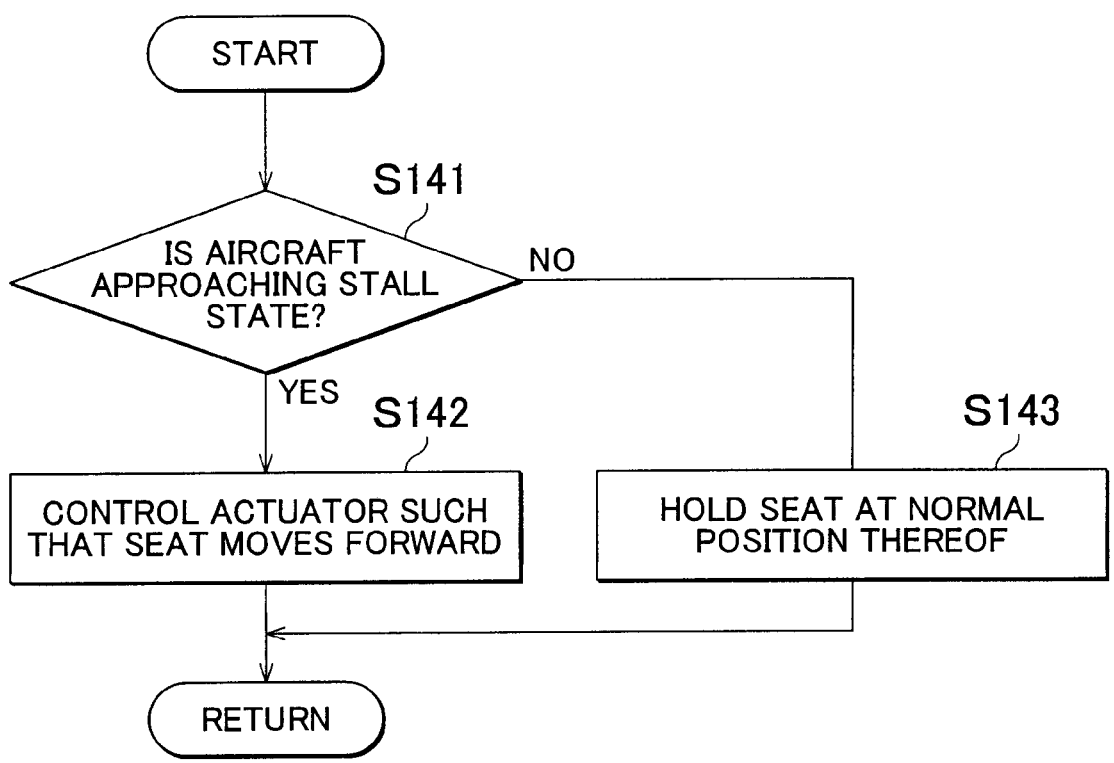
FIG. 14 is a flowchart showing an instruction processing procedure performed by a controller shown in FIG. 13.

FIG. 14 is a flowchart showing an instruction processing procedure performed by the controller 55. It should be noted that the seat 52 is usually located at a rear position of the rail guide 53 as shown in FIGS. 13 and 15A.

Referring to FIG. 14, it is first determined on the basis of a detection value of the stall sensor 40 whether or not the fuselage H is approaching a stall state (step S141). When it is determined that the fuselage H is approaching the stall state, the actuator 54 is controlled such that the seat 52 is moved forward along the rail guide 53 (step S142). Thus, the pilot P recognizes that the fuselage H is approaching the stall state, and the yoke 51 is tilted forward without forcing the pilot P to abandon his/her posture. As a result, the fuselage H can get out of a stall pitch angle.

Figure 15A:
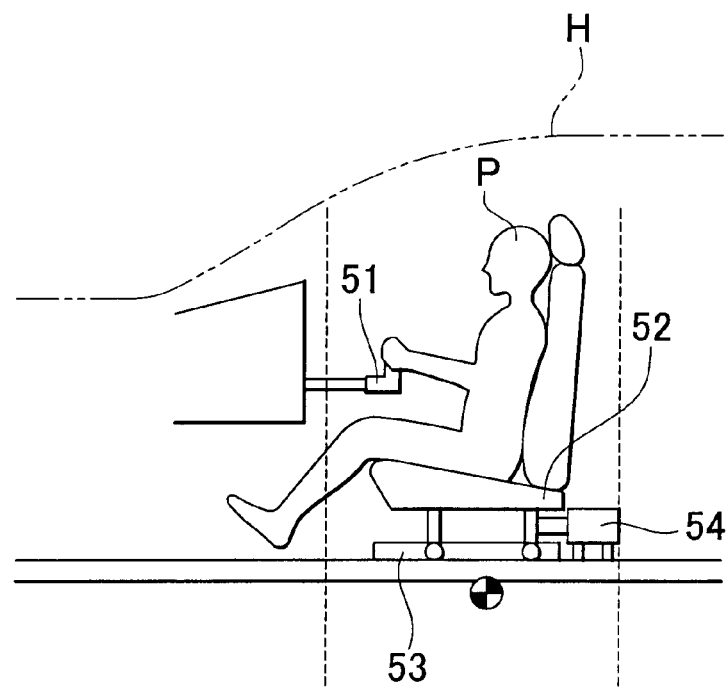
FIGS. 15A and 15B are lateral views showing a state where a seat shown in FIG. 13 is moved forward along a rail guide.
Figure 15B:
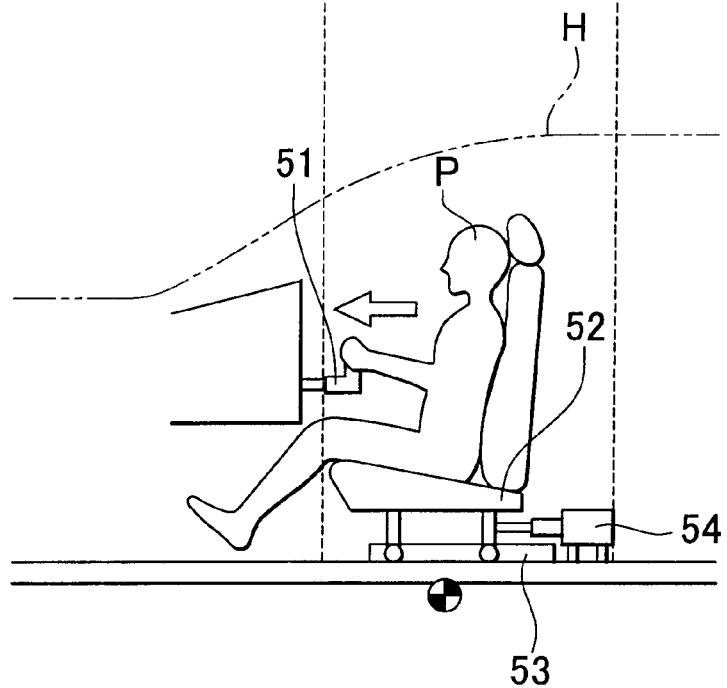

On the other hand, when it is determined that the fuselage H is not approaching the stall state, the seat 52 is held at a normal position thereof as shown in FIG. 15A (step S143). Accordingly, when the fuselage H makes a recovery from the stall state, the actuator 54 is controlled such that the seat 52 is moved backward along the rail guide 53.

As described above, in this embodiment of the invention, the position of the seat 52 is moved forward to thereby instruct the pilot P of an approach of the fuselage H to the stall state. Therefore, the pilot P can operate the yoke 51 naturally in such a direction as to avoid a stall. Thus, even when the fuselage H approaches the stall state, the pilot P can fly the aircraft appropriately.

Further, the position of the center of gravity of the fuselage H shifts forward due to the forward movement of the position of the seat 52. Therefore, a head-down moment of the fuselage H is obtained, and hence the fuselage H assumes a stall avoiding posture. Accordingly, the fuselage H can more effectively make a recovery from the stall.

The foregoing embodiments of the invention can be used by being appropriately combined with one another. For example, the flight assistance apparatus regarding the collision range of the fuselage in each of the first embodiment of the invention and the second embodiment of the invention may be combined with the flight assistance apparatus regarding the speed range in which the fuselage falls into the aforementioned stall state in each of the first embodiment of the invention and the second embodiment of the invention.

In the aforementioned construction, the yoke may have a column body, and a pair of right and left grip portions turnably mounted to the column body to be gripped by the pilot. The flight instruction section may instruct the pilot to fly the aircraft in such a manner as to avoid the critical flight range by turning the grip portions with respect to the column body. In the aforementioned construction, when the aircraft approaches a collision range as the critical flight range, that one of the grip portions which is located, for example, opposite a direction corresponding to the collision range is turned downward in a tilted manner. Thus, the pilot can be easily and reliably instructed to fly the aircraft in such a manner as to avoid the critical flight range.

In the aforementioned construction, the critical flight range may be a collision range of the fuselage. The flight instruction section may hold the grip portions turned from normal states thereof with respect to the column body until the yoke is operated oppositely to a direction corresponding to the critical flight range. In the aforementioned construction, when the aircraft approaches the critical flight range (the collision range), that one of the grip portions which is located, for example, opposite the direction corresponding to the collision range is held in a downward tilted state. Accordingly, the pilot can be caused to easily operate the yoke in such a direction as to avoid the critical flight range.

In the aforementioned construction, the yoke may have a column body provided with a pair of right and left handles, and a pair of right and left grip portions movably mounted along the handles respectively to be gripped by the pilot. The flight instruction section may instruct the pilot to fly the aircraft in such a manner as to avoid the critical flight range by moving the grip portions along the handles respectively. In the aforementioned construction, when the aircraft approaches the collision range as the critical flight range, that one of the grip portions which is located, for example, opposite the direction corresponding to the collision range is moved downward, and that one of the grip portions which is located, for example, on the side corresponding to the collision range is moved upward. Thus, the pilot can be easily and reliably instructed to fly the aircraft in such a manner as to avoid the critical flight range.

In the aforementioned construction, the critical flight range may be a collision range of the fuselage. The flight instruction section may hold the grip portions in states of being moved from normal positions thereof with respect to the handles respectively until the yoke is operated oppositely to the direction corresponding to the critical flight range. In the aforementioned construction, when the aircraft approaches the critical flight range (the collision range), that one of the grip portions which is located, for example, opposite the direction corresponding to the collision range moves downward, and that one of the grip portions which is located, for example, on the side corresponding to the collision range is held in an upward moved state. Accordingly, the pilot can be easily caused to operate the yoke in a direction corresponding to such a direction as to avoid the critical flight range.

In the aforementioned construction, the yoke may have a column body, and a pair of right and left grip portions longitudinally turnably mounted to the column body to be gripped by the pilot. The flight instruction section may instruct the pilot to fly the aircraft in such a manner as to avoid the critical flight range by turning the grip portions toward the near side with respect to the column body. In the aforementioned construction, when the aircraft approaches a stall state as the critical flight range, the grip portions turn toward the near side with respect to the column body. Thus, the pilot can be easily and reliably instructed to fly the aircraft in such a manner as to avoid the critical flight range. Further, in this case, the pilot can return the yoke in a stall recovery direction without changing the longitudinal positions of his/her arms.

While the invention has been described with reference to the example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A flight assistance apparatus for providing assistance in flying an aircraft, comprising:
   a yoke operated by a pilot of the aircraft; and
   a flight instruction section that instructs, with an aid of the yoke, the pilot to fly the aircraft in such a manner as to avoid a critical flight range when the aircraft approaches the critical flight range,
wherein
   the yoke has a column body, and a pair of right and left grip portions turnably mounted to the column body to be gripped by the pilot, and
   the flight instruction section instructs the pilot to fly the aircraft in such a manner as to avoid the critical flight range by said flight instruction section turning the grip portions with respect to the column body.

2. The flight assistance apparatus according to claim 1, wherein
   the critical flight range is a collision range of a fuselage of the aircraft, and
   the flight instruction section holds that one of the grip portions which is located opposite a direction corresponding to the critical flight range turned from a normal state thereof with respect to the column body.

3. The flight assistance apparatus according to claim 1, wherein
   the critical flight range is a collision range of a fuselage of the aircraft, and
   the flight instruction section holds downside that one of the grip portions which is located opposite a direction corresponding to the critical flight range.

4. The flight assistance apparatus according to claim 1, wherein
   the critical flight range is a collision range of a fuselage of the aircraft, and
   the flight instruction section holds the grip portions turned from normal states thereof with respect to the column body until the yoke is operated oppositely to a direction corresponding to the critical flight range.

5. A flight assistance apparatus for providing assistance in flying an aircraft, comprising:
   a yoke operated by a pilot of the aircraft; and
   a flight instruction section that instructs, with an aid of the yoke, the pilot to fly the aircraft in such a manner as to avoid a critical flight range when the aircraft approaches the critical flight range
wherein
   the yoke has a column body provided with a pair of right and left handles, and a pair of right and left grip portions movably mounted along the handles respectively to be gripped by the pilot, and
   the flight instruction section instructs the pilot to fly the aircraft in such a manner as to avoid the critical flight range by said flight instruction section moving the grip portions along the handles respectively.

6. The flight assistance apparatus according to claim 5, wherein
   the critical flight range is a collision range of a fuselage of the aircraft, and
   the flight instruction section holds in a moved state that one of the grip portions which is located opposite the direction corresponding to the critical flight range.

7. The flight assistance apparatus according to claim 5, wherein
   the critical flight range is a collision range of a fuselage of the aircraft, and
   the flight instruction section moves downward that one of the grip portions which is located opposite the direction corresponding to the critical flight range.

8. The flight assistance apparatus according to claim 5, wherein
   the critical flight range is a collision range of a fuselage of the aircraft, and
   the flight instruction section holds the grip portions moved from normal positions thereof with respect to the handles respectively until the yoke is operated oppositely to the direction corresponding to the critical flight range.

9. A flight assistance apparatus for providing assistance in flying an aircraft, comprising:
   a yoke operated by a pilot of the aircraft; and
   a flight instruction section that instructs, with an aid of the yoke, the pilot to fly the aircraft in such a manner as to avoid a critical flight range when the aircraft approaches the critical flight range
wherein
   the yoke has a column body, and a pair of right and left grip portions longitudinally turnably mounted to the column body to be gripped by the pilot, and
   the flight instruction section instructs the pilot to fly the aircraft in such a manner as to avoid the critical flight range by said flight instruction section turning the grip portions toward a near side with respect to the column body.

10. The flight assistance apparatus according to claim 9, further comprising a stall sensor that detects a stall state of a fuselage of the aircraft, wherein the critical flight range is a speed range in which the fuselage falls into the stall state, and the flight instruction section turns the grip portions toward the near side with respect to the column body when the fuselage approaches the stall state.

11. The flight assistance apparatus according to claim 9, wherein the critical flight range is a speed range in which a fuselage of the aircraft falls into the stall state, and the flight instruction section holds the grip portions turned from normal states thereof with respect to the column body until the fuselage gets out of the critical flight range.

\* \* \* \* \*